United States Patent [19]
Rooney

[11] 3,790,046
[45] Feb. 5, 1974

[54] COAT HANGER WITH COLLAPSIBLE HOOK

[75] Inventor: James L. Rooney, Erie, Pa.
[73] Assignee: Niagara Plastics, Inc., Eria, Pa.
[22] Filed: Jan. 28, 1972
[21] Appl. No.: 221,510

[52] U.S. Cl. .............................................. 223/92
[51] Int. Cl. ........................................... A47j 51/08
[58] Field of Search...... 223/89, 92, 94, 85; 24/214, 24/213 CS, 208 A

[56] References Cited
UNITED STATES PATENTS

| 2,434,430 | 1/1948 | Paulic | 223/95 X |
| 3,238,586 | 3/1966 | Stoffel | 24/213 CS |
| 1,577,290 | 3/1926 | Nash | 223/88 |
| 2,633,276 | 3/1953 | Gillespie et al. | 223/94 X |
| 3,494,517 | 2/1970 | Hart | 223/94 |

FOREIGN PATENTS OR APPLICATIONS

| 697,236 | 9/1953 | Great Britain | 223/94 |
| 353,917 | 7/1931 | Great Britain | 223/87 |

Primary Examiner—George H. Krizmanich
Attorney, Agent, or Firm—Charles L. Lovercheck

[57] ABSTRACT

A coat hanger made of a hook and a body. The hook and body are both made of molded plastic material. The hook is swingably connected to the body by a pivot member and swingable from a collapsed position to a use position. The pivot member is integrally connected to the body and extends through a hole in the hook and a detent on the hook engages the recess in the body when the hook is in use position. The pivot member has a head made up of spaced flangelike members that overlie the part of the body and the pivot has a hole through it so that the head members can be deflected toward each other and spread after the hook is installed on the body.

1 Claim, 7 Drawing Figures

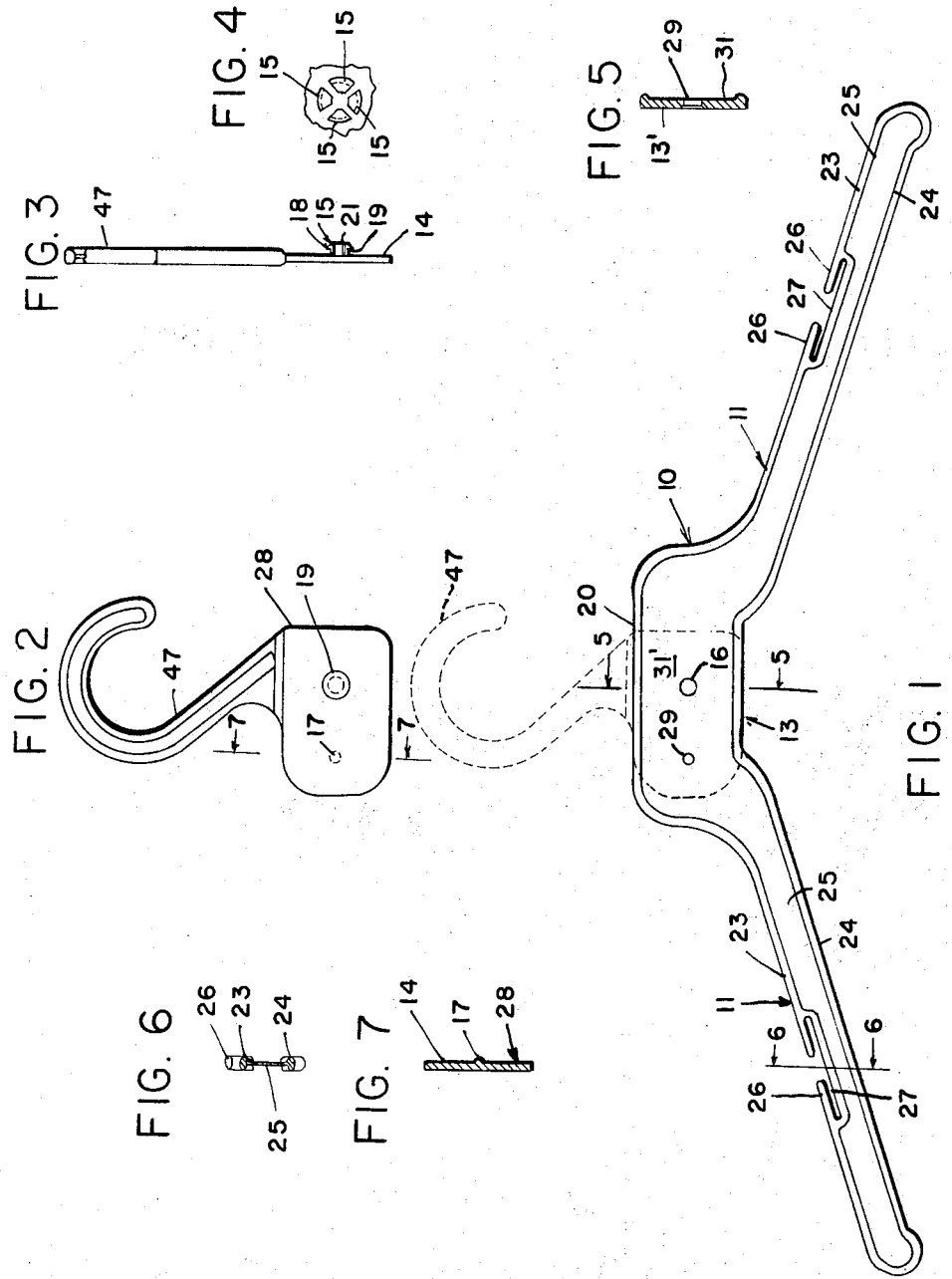

COAT HANGER WITH COLLAPSIBLE HOOK

OBJECTS OF THE INVENTION

It is an object of the invention to provide an improved coat hanger.

Another object of the invention is to provide a coat hanger in combination with a collapsible hook.

With the above and other objects in view, the present invention consists of the combination and arrangement of parts hereinafter more fully described, illustrated in the accompanying drawing and more particularly pointed out in the appended claims, it being understood that changes may be made in the form, size, proportions, and minor details of construction without departing from the spirit or sacrificing any of the advantages of the invention.

DESCRIPTION OF THE DRAWINGS

FIG. 1 is a front view of the body with the hook shown in phantom.

FIG. 2 is a front view of the hook separated from the body.

FIG. 3 is a right side view of the hook.

FIG. 4 is an enlarged partial rear view of the hook of FIG. 2 showing the snap detent.

FIG. 5 is a cross sectional view taken on line 5—5 of FIG. 1.

FIG. 6 is a cross sectional view taken on line 6—6 of FIG. 1.

FIG. 7 is a cross sectional view taken on line 7—7 of FIG. 2.

DETAILED DESCRIPTION OF THE DRAWINGS

The coat hanger shown has a body generally indicated at 10 and has laterally extending arms 11 for supporting a garment. The arms 11 are integrally connected by the intermediate part. The intermediate part 13 has a flat surface 13'. The flat surface 13' has a recess 16 formed in it that receives the detent 17 on the hook when the hook is in the use position indicated by the phantom lines in FIG. 1.

The arms 11 have the spaced flanges 23 and 24 connected by web 25.

Spaced overlying members 26 are provided which define a space 27 for straps of garments.

The hook is made up of a hook member 47 and an enlarged connecting member 28. The connecting member 28 is integrally attached to the hook. The connecting member has a flat surface 14 that lies in face-to-face relation with flat surface 13' on the body 10. A stop 20 is integrally attached to the member 13 and it extends outward and engages the upper corner of the hook to limit its travel. When the pivot members 15 are received in the opening 29, the heads 18 overlie the intermediate part 13. The pivot member 19 is made up of four spaced members 15, each having neck members, each of which has an outwardly extending head member 18 on it. The head members overlie the flat surface 14 on the intermediate part 13 when the pivot is inserted in the hole 29. The four spaced members 15 may be deflected toward each other to permit the head members 18 to snap over the member 13. When the hook is in use position, the detent 17 will rest in recess 16 and the upper corner of member 28 will rest against stop 20. The hook can be swung about its pivot until the hook lies along side leg 25.

The entire hanger can be molded of a resilient plastic material familiar to those skilled in the art. To assemble the hook 47 to the body 10, the surface 14 of the enlarged connecting member 28 is faced toward the surface 13' on the intermediate part 13 of the body. The tapered outer surfaces of the spaced members 15 are forced into the opening 29 in the intermediate part. Heads 18 will then snap over the surface 31 on the opposite side of the intermediate part and the spaced members 15 form a pivot on which the hook 47 may swing on the body 10.

When the hook 47 is swung to the phantom line position shown in FIG. 1, detent 17 snaps into recess 16 and, at the same time, the corner of enlarged member 28 engages stop member 20, thereby holding the hook in rigid position relative to the body.

To fold the hook 47, the above procedure is reversed; that is, the enlarged member 28 is swung about its pivot 19, lifting detent 17 out of recess 16 and hook 47 can then lie along the arms 11 of the body 10.

The foregoing specification sets forth the invention in its preferred practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A clothes hanger comprising a body and a hook,
   said body having an intermediate part having a flat surface and outwardly extending arms integrally attached to said intermediate part to engage the shoulders of a garment,
   said intermediate part having a flat surface with an opening in said intermediate part,
   said hook member having a hook and an integrally attached enlarged connecting member,
   said enlarged connecting member having a flat surface,
   said flat surface on said enlarged connecting member engaging the flat surface on said intermediate part in face-to-face engagement and a pivot integrally attached to said connecting member being received in said opening in said intermediate part,
   said pivot member having a neck with spaced laterally extending heads overlying the said intermediate part and holding said hook member securely thereto,
   a detent extending outward from said flat surface on said enlarged connecting member and engaging a recess on the intermediate part when said hook is in use position,
   said hook being adapted to swing to collapsed position along one of said arms.

* * * * *